R. L. WILLIAMS.
EMULSIFIER.
APPLICATION FILED AUG. 2, 1913.
1,200,559.
Patented Oct. 10, 1916.
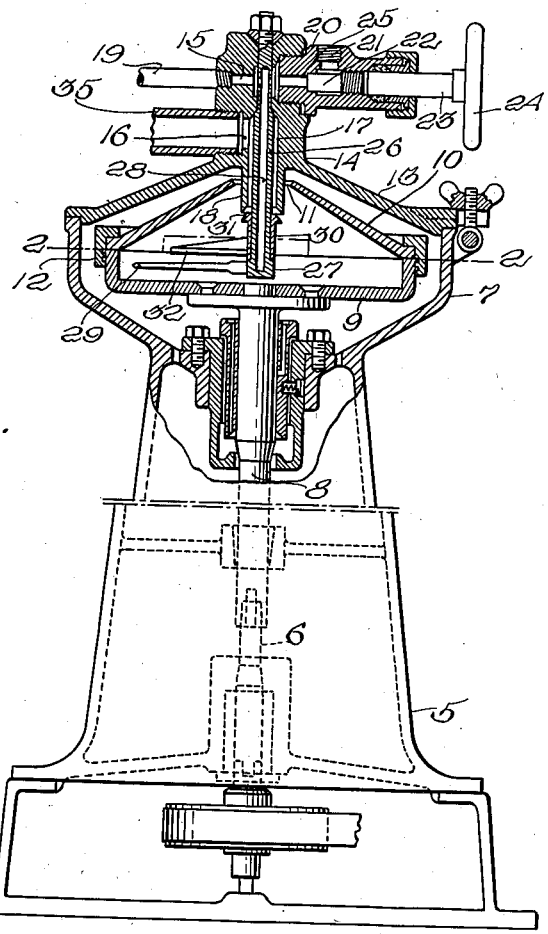
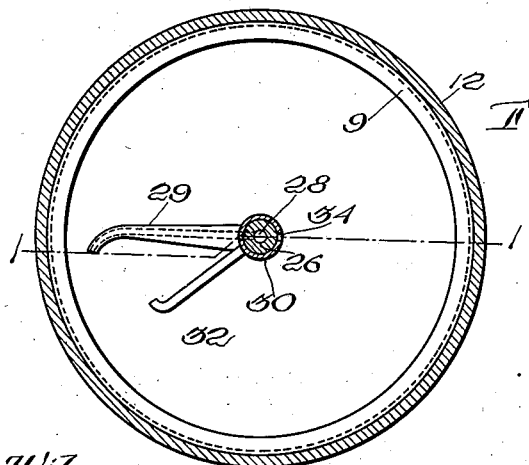
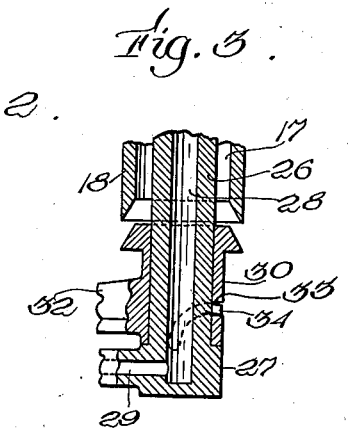
Witnesses:
A. H. McGlinchey.
E. C. Murphy.
Inventor:
Robert L. Williams
By Henry J. Miller
atty.

UNITED STATES PATENT OFFICE.

ROBERT L. WILLIAMS, OF BRIGHTON, MASSACHUSETTS, ASSIGNOR TO JOHN W. DAVIES, OF READING, MASSACHUSETTS.

EMULSIFIER.

1,200,559.  Specification of Letters Patent.  Patented Oct. 10, 1916.

Application filed August 2, 1913. Serial No. 782,713.

*To all whom it may concern:*

Be it known that I, ROBERT L. WILLIAMS, a citizen of the United States, residing at Brighton, in the county of Suffolk and State of Massachusetts, have invented certain new and useful Improvements in Emulsifiers, of which the following is a specification, reference being had to the accompanying drawings, forming part thereof.

This invention relates to that class of emulsifying machines in which milk, cream or any other liquid, at some point or points in its passage through the machine, is forced between surfaces, through orifices or is operated on while under pressure to emulsify said milk, cream or other liquid to render the same more homogeneous and, particularly, in such emulsifying process to disrupt the globules of fatty matter contained in the milk or cream or, in the case of liquid generally, to disrupt and distribute any more or less segregated particles carried by such liquid.

The invention also relates to the means for delivering a constant supply of liquid at a high velocity.

One of the objects of this invention is to provide a rotary chamber or bowl with means for automatically controlling the supply of liquid thereto and with a pipe which receives the liquid under the high velocity developed and delivers said liquid at a point outside said bowl whereby the flow of liquid into and out of said bowl may be practically constant.

Another object of the invention is to so construct an emulsifying machine that by the use of a rotary chamber or bowl, to which the liquid under operation is supplied, the liquid is subjected to a high velocity, which velocity is changed into pressure after the liquid leaves said bowl or chamber to force said liquid through or between squeezing or emulsifying devices. I accomplish this by the use of comparatively small power while by changing the circular motion of the liquid to a linear motion through the pipe leading to the the squeezing or emulsifying devices I avoid the use and resultant care of the comparatively large receptacle which, in some forms of emulsifying machines, embraces the rotary bowl and receives the liquid discharged from the periphery thereof.

The invention consists in the means for subjecting liquid to a high initial velocity through rotary action, and changing the rotary motion to a linear motion, and at the same time controlling the supply of liquid so that the body of rotating liquid will remain constant.

The invention also consists in the rotary means for subjecting the liquid to a high rotary velocity and the means for delivering said liquid under said high velocity to squeezing or emulsifying devices whereby said velocity is converted into pressure to force said liquid through or between said emulsifying devices.

The invention also consists in the means for automatically controlling the supply of liquid to the rotary chamber.

The invention also consists in such other novel features of construction and combination of parts as shall hereinafter be more fully described and pointed out in the claims.

Figure 1, represents a vertical sectional view of the improved emulsifier as taken on line 1—1 Fig. 2. Fig. 2, represents a cross sectional view taken on line 2—2 Fig. 1. Fig. 3, represents an enlarged detail sectional view of portions of the liquid supply and delivery or conveying devices as taken on line 1—1 Fig. 2.

Similar characters of reference designate corresponding parts throughout.

As shown in the drawings in its preferred form my improved emulsifying machine has the frame 5 in bearings of which is journaled the shaft 6 adapted to be driven in any well known manner. At the upper portion of said frame 5 is the basin 7 provided with the closure and support 13 for apparatus to be hereinafter described.

Journaled in a bearing of the basin 7 is the shaft 8, which is slidably engaged with shaft 6, to be driven thereby, and at its upper end is provided with the bowl or chamber 9 having the inwardly extending top wall or member 10 having the central opening 11, said wall or member 10 being secured to chamber 9 by the screw ring 12 whereby said ring overlaps the joint between the meeting edges or faces of chamber 9 and member 10 to prevent, so far as is practical, leakage of liquid through said joint. This detachable mounting for the wall or member 9 is preferred as ring 12 may be unscrewed and the wall 10 may thus be separated from chamber 9 to facilitate the cleaning of its several parts.

The closure or support 13 is adapted to fit basin 7 and is secured thereto in any well known manner. This closure 13 forms a support for supply and return pipes or passages which supply liquid to be operated upon to chamber 9 and return said liquid under pressure exerted thereon by circular action to the emulsifier apparatus as will now be described. Located centrally of said closure 13 is the boss 14 having the radial passages 15 and 16 which intersect the vertical axial bore 17 which latter has an enlarged diameter downward from its point of intersection with the passage 16 and is extended through the central opening 11 in the wall or top member 10 of chamber 9 by the tubular extension 18 the lower end of which is shaped to form a valve seat.

Mounted in one end of passage 15 is the gage pipe 19 while in the other end of said passage is secured the axially bored fitting 20 having the seat 21 against which the squeezing plug 22 is held by the stem 23 screwed into the bore of fitting 20 and having the hand wheel 24. From said bore of fitting 20 extends the outlet passage 25 through which liquid after passing between the end of plug 22 and its seat 21 may escape. Secured in the vertical axial passage 17 is the stem 26 having at its lower end the enlargement 27 forming a shoulder and having the passage 28 which communicates at its upper end with the passage 15 and at its lower end with the pipe 29 fixed to said stem 26 and extending toward the peripheral wall of chamber 9, the outer end of this pipe 29 being preferably curved in a direction opposite to that in which said chamber 9 is adapted to rotate and the bore in said pipe forming part of the outlet pipe through which liquid may flow under momentum resulting from rotary action of said liquid.

Rotatable on the stem 26 between the enlargement thereof and the valve seat of the tubular extension 18 is the sleeve 30 having the valve 31 and the radially extending arm 32 while in said sleeve is formed the cam slot 33 engaged with the pin 34 of said stem 26 whereby when the said sleeve 30 is rotated in the right direction, as by the swinging of its arm 32 by undue pressure thereagainst of liquid in said chamber 9, said sleeve 30 is moved upward and its valve 31 closes against the seat of the lower end of the extension 18 to control the supply of liquid to said chamber 9.

Shafts 6 and 8 are driven to effect the rotation of chamber 9 and milk, cream or other liquid to be subjected to the emulsifying process in this machine is continuously supplied through pipe 35. The liquid runs through the inlet pipe 17, past the valve 31 into the bowl. The rotation of the bowl rotates the liquid at high velocity and the centrifugal force developed carries it against the inner circumference of the bowl, the liquid traveling at high velocity is impelled against the mouth of pipe 29 of the outlet pipe and flows through the outlet pipe in which it meets the obstruction formed by the emulsifying device which resists the flow of the liquid and therefore creates pressure in the liquid. The liquid then passes through the narrow passage between the elements of the emulsifier which are adjustably movable one toward the other. In passing through this narrow passage the liquid again attains a high velocity and the fat globules are disrupted and distributed through the liquid, which finally escapes through the outlet 25.

In the operation above described the centrifugal action drives the milk or some portion of the milk against the confining wall of the bowl 9 and those impurities carried by the milk and of a specific gravity higher than the milk will be driven outward toward said confining wall to which they will adhere with some portion of the liquid as a pasty mass. This mass is eventually scraped off when the bowl is cleaned.

By suitably adjusting the hand wheel 24 of the emulsifying device, the pressure on the liquid passing through it can be regulated within the limit permitted by the speed of the machine, and the quantity of delivery can be controlled. The automatic inlet valve 31 being actuated by the arm 32 is moved by the mass of the rotating liquid when the bowl is filled to a predetermined amount and thus prevents a supply of liquid to the apparatus in excess of the amount delivered.

While the herein described specific apparatus represents the best means for carrying out my invention known to me, it is obvious that other means may be substituted for those herein described, the relative movement of the parts and their specific relation one to another may be altered without departing from my invention. For example, the supply pipe and the delivery pipe with their related parts may be separate and lead through any convenient point in the closure.

If the liquid in the rotary chamber 9 from over supply or otherwise, acts against arm 32 said arm will be swung to rotate its sleeve 30 in a direction to ride upward on the pin 34, engaged with slot 33 of said sleeve whereby valve 31 is moved toward its seat on the lower end of the tubular extension 18 to control the flow of liquid therefrom or to wholly close said seat if the pressure of the liquid against the controller arm 32 is sufficient, whereby the supply of liquid in said chamber 9 remains practically constant.

The speed of rotation of chamber 9 and the pressure developed by or through the high velocity of the liquid attained by rotary action depends somewhat on the nature of the liquid under operation, as well as the tightness of fit of the plug 22 against its seat 21, and the pressure of the liquid may depend to some extent on the relative dimensions of the several parts and on their specific arrangement but as to these matters it is not my intention to limit my invention.

I am aware that various kinds of devices for disrupting or distributing the globules or larger particles of matter in liquid have heretofore been used and therefore by the term emulsifier herein used it is my intention to include any known device of this general nature.

Having thus described my invention I claim as new and desire to secure by Letters Patent.

1. An emulsifier comprising a rotary chamber adapted to receive liquid, an outlet pipe having its open end positioned within said chamber and communicating with an emulsifier element, and means for adjusting said emulsifier element whereby pressure of liquid in said outlet pipe may be controlled by such adjustable means.

2. An emulsifier having in combination, a rotary bowl, a supply pipe, an outlet pipe having a mouth opening into said bowl, elements having squeezing surfaces within said outlet pipe, and an adjustable screw stem bearing against one of said elements.

3. An emulsifier comprising a supply pipe, a receiving emulsifier pipe, means for impelling liquid at high velocity into said receiving pipe, said means including a rotary container into which both of said pipes extend, a valve for controlling the flow of liquid from said supply pipe, and controlling means for said valve operable by the liquid in said container.

4. An emulsifier having in combination, a supply pipe, a container, an outlet pipe, means to rotate the container, a valve in said supply pipe automatically controlled by a gage positioned in said container adapted to be moved by the rotating liquid when the latter fills the container to a predetermined amount.

5. In combination a supply pipe, a container, an outlet pipe, means to rotate the container, a valve in said supply pipe and a device controlling said valve having a part positioned between the axis of said container and its circumference and adapted to be moved by the rotating liquid when the latter fills the container to a predetermined amount.

6. In combination a supply pipe, a rotatable bowl, an outlet pipe, means to rotate the bowl, a valve in said supply pipe and a device controlling said valve having a part positioned between the axis of said bowl and its circumference and adapted to be moved by the rotating liquid when the latter fills the bowl to a predetermined amount.

7. An emulsifier having in combination a supply pipe, a container, an outlet pipe, means to rotate the container, a valve in said supply pipe, a device controlling said valve having a part positioned between the axis of said container and its circumference and adapted to be moved by the rotating liquid when the latter fills the container to a predetermined amount, and an emulsifying device in said outlet pipe.

8. An emulsifier having in combination a container, a supply pipe, an outlet pipe containing an emulsifying device, means to rotate the container, a valve in said inlet pipe, automatic valve operating means adapted to be actuated by the mass of the rotating liquid and said emulsifying device having elements adjustable one toward the other.

9. In combination a container, a supply pipe, an outlet pipe, means to rotate the container, a valve in said inlet pipe, an automatic valve operating means adapted to be actuated by the mass of rotating liquid.

10. An emulsifier of the nature described, comprising a rotary chamber adapted to receive liquid, an outlet pipe having its open end positioned within said chamber, and an emulsifier mechanism connected with said pipe.

11. An emulsifier of the nature described, comprising a rotary chamber, a liquid supply pipe for said chamber, a valve for said pipe, and movable means for operating said valve, said movable means positioned within said chamber.

12. An emulsifier of the nature described comprising a rotary chamber, a liquid supply pipe for said chamber, a valve for said pipe, and movable means operatively connected with said valve and adapted to be actuated in the operating direction by the liquid within said chamber.

13. An emulsifier of the nature described comprising a rotary chamber, a liquid supply pipe delivering into said chamber and having a valve seat at its end, a valve for said seat having a laterally extending arm, and sustaining means for said valve and cooperating therewith to effect movement of said valve toward and from its seat under movement of said valve by said arm.

14. An emulsifier of the nature described, comprising a rotary chamber, a supply pipe delivering into said chamber, an outlet pipe located within said supply pipe, an emulsifier connected with said outlet pipe, and means for controlling the flow of liquid from said supply pipe.

15. An emulsifier of the nature described comprising a rotary chamber, a supply pipe delivering into said chamber, an outlet pipe extending in line with said supply pipe and having a laterally extending pipe, an emulsifier connected with the outer end of said outlet pipe, and means actuable by the liquid within said chamber for controlling the liquid supply.

16. An emulsifier of the nature described, comprising a rotary chamber, a supply pipe positioned axially of said chamber and having a valve seat at its end, an outlet pipe located within said supply pipe and having at its lower end a laterally extending pipe, a valve having a sleeve journaled on said outlet pipe and having a laterally extending actuator arm, said outlet pipe and valve sleeve having coöperating means for moving said valve toward and from its seat during rotative movement.

17. An emulsifier of the nature described comprising a rotary chamber closed as to its periphery and having an inwardly extending top member having a central opening, a supply pipe extending through said opening, an outlet pipe extending through said supply pipe and having at its lower end a laterally extending pipe, and an emulsifier connected with said outlet pipe.

18. An emulsifier of the nature described comprising a casing, a vertical spindle journaled in said casing and having a centrifugal chamber, a closure for said casing having a supply pipe furnished at its lower end with a valve seat, a valve coöperating with said seat, an outlet pipe extending through said supply pipe and secured in a member of said closure, said outlet pipe having at its lower end a laterally extending pipe, and an emulsifier connected with the outer end of said outlet pipe.

19. An emulsifier of the nature described comprising a casing, a vertical spindle journaled in said casing, a chamber mounted on said spindle, a closure for said casing having at its central portion a vertical pipe member, an emulsifying mechanism having its casing secured in said member and communicating with the bore thereof, an outlet pipe mounted in the bore of said member and having openings in its wall at the upper end, said outlet pipe having at its lower end a laterally extending mouth member.

ROBERT L. WILLIAMS.

Witnesses:
   HENRY J. MILLER,
   ESTHER C. MURPHY.